Nov. 23, 1926.

J. CARSON ET AL 1,607,943

JOINT FOR PIPES AND OTHER FLUID CONVEYERS AND CONTAINERS

Filed Nov. 4, 1925

INVENTORS
JAMES CARSON
GEORGE LIDDELL
By John B. Brady.
Attorney.

Patented Nov. 23, 1926.

1,607,943

UNITED STATES PATENT OFFICE.

JAMES CARSON AND GEORGE LIDDELL, OF COATBRIDGE, SCOTLAND, ASSIGNORS TO STEWARTS AND LLOYDS, LIMITED, OF GLASGOW, SCOTLAND.

JOINT FOR PIPES AND OTHER FLUID CONVEYERS AND CONTAINERS.

Application filed November 4, 1925, Serial No. 66,810, and in Great Britain April 14, 1925.

This invention relates to joints for pipes and other fluid conveyers or containers and has for its object to provide a joint therefor which shall be fluid-sealed and leak-proof when under internal or external pressure or under a vacuum either internally or externally.

Joints which are fluid tight under internal pressure (and in some cases also external pressure) have hitherto been proposed, such joints comprising flexible packing rings which are generally of U or channel shape with tapering lips or flanges, the channel packing being held in place by a suitable housing and the packing being so arranged that the fluid under pressure can enter the hollow of the packing and cause the lips or flanges to tighten against the pipes or the like to make a leak-proof joint. Of course the greater the pressure within the pipe the greater is the pressure exerted on the lips or flanges and therefore the tighter the joint.

According to the present invention a joint for pipes and other fluid conveyers or containers comprises a flexible packing ring having a mid portion adapted to cover over and press against the abutting ends of the pipes or the like and side portions or flanges adapted to press against external peripheral projections on the pipes or the like the packing being held in place at and around the junction of the pipes or the like by a housing which is made so as to press on the mid portion and hold it tightly over the junction and also to press the flanges against the projections on the pipes or the like.

The flexible packing ring, is, preferably, of somewhat M-shape in cross section, that is to say, it has a depressed mid portion and hollow angular upstanding side portions or flanges the space between the angular flanges forming a peripheral channel or trough of somewhat V shape. The hollows in the angular side portions are, preferably, constituted by grooves of inverted V formation. The said M-section packing is adapted to be fitted over the joint of the pipes or the like and is disposed between external peripheral projections on the adjoining ends of the said pipes or the like being enclosed by a housing which holds the pipes or the like together by engagement with the said projections and which also has its interior peripheral surface shaped to conform to the outer peripheral surface of the M-section packing and is therefore capable of pressing the mid portion of the M-section packing tightly over the gap between the ends of the pipes or the like and also of forcing the side portions or flanges of the M-section packing tightly against the aforesaid projections of the pipes or the like in this way giving a triple sealing or leak preventing effect. When the packing is subjected to internal pressure the angular flanges or side portions of the packing are forced, by the fluid pressure entering the hollows of the flanges, tightly into the grooves of the housing and also tightly against the projections on the pipes or the like and when the packing is subjected to external fluid pressure the mid portion of the packing ring is forced by the fluid pressure tightly down on the ends of the pipes or the like while the angular flanges are forced against said collars, so that, in both cases, an absolutely tight joint is provided. The housing may consist of two or more parts so made that when simply drawn face to face initial pressure is set up between the housing and the packing; and moreover to obtain initial pressure between the plane side surfaces of the ring and the adjacent inner surfaces of the projections on the adjoining ends of the pipes or the like, the side portions of the packing ring are splayed slightly outwards from the cylindrical mid portion thereof so that the width of the ring increases from the outer towards the inner periphery and, when the ring is placed between the projections on the pipes, the said side portions exert an initial pressure on the adjacent inner surfaces of the said projections.

The invention will now be described by way of example and with reference to the annexed drawing in which:—

Figure 1:
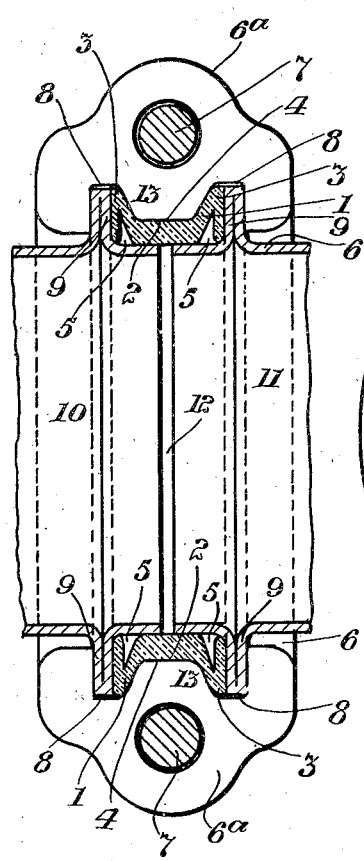
Fig. 1 is a view of the joint in vertical cross section.
Figure 2:
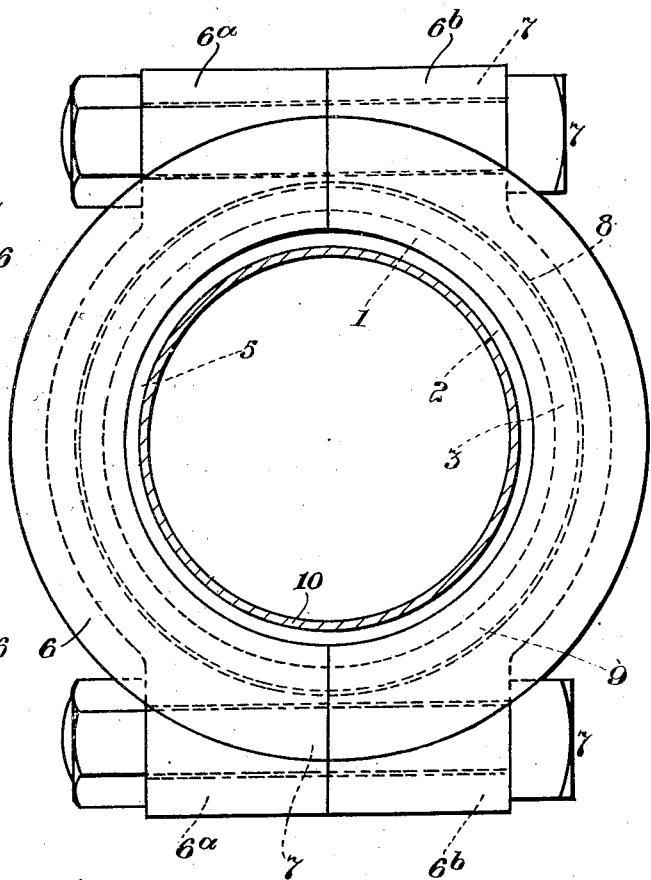
Fig. 2 is a complete view of the assembled joint in end elevation.
Figure 3:
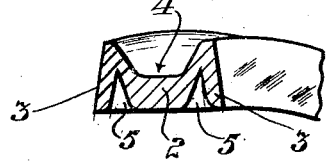
Fig. 3 is a section of the packing ring with part in perspective.

The packing consists of a ring 1 having a substantially cylindrical mid portion 2 provided with an external angular flange 3 at each side. The thickness of the flanges 3, parallel to the axis of the ring 1, increases from the periphery inwards thus forming a central groove or annular channel 4 in the exterior of the ring. On the interior surface of the ring two inverted V-shaped circular recesses or grooves 5 are formed so as to leave flexible thin walled side portions as shown at Figure 3.

The housing 6 is made in two or more parts such as 6ª, 6ᵇ adapted to be detachably secured together by means of bolts 7 or otherwise, and is provided with two circular grooves or recesses 8 in its interior, corresponding in shape to the flanges 3 on the packing ring 1 and made somewhat larger to accommodate, in addition to the flanges 3 of the ring 1, the collars 9 on the pipes 10 and 11. Between these two recesses, the housing 6 has an annular rib 13 somewhat V-shaped to correspond to and bear on the external groove or channel 4 in the packing ring between the flanges 3 thereof.

In joining up the two pipes 10 and 11, the packing ring 1 is slipped over the end of the pipe, 10, for example, and is pushed up against the collar 9 thereon. The ring 1 is made a neat fit upon the pipe. Half of the ring 1 now projects over the end of the pipe 10 and into this socket or projecting portion the end of the other pipe 11 is inserted till the collar 9 thereon comes up against the packing ring 1 whose length axially is such as just to prevent the ends of the pipes 10 and 11 contacting when the collar 9 on each pipe is bearing on the sides of the ring 1. The parts of the housing 6 are placed in position round the packing ring 1 and the collars 9 on the pipes, the outer edges of the recesses 8 in the housing 6 being arranged to rest against the outer faces of the collars 9 on the pipes. When the parts 6ª, 6ᵇ of the housing 6, are being secured together the portion of the housing between the recesses 8 therein is pressed into the external groove 4 in the ring 1 and, effecting a wedging action, opens out the said groove 4 and causes the plane sides of the ring 1 to bear tightly against the adjacent inner surfaces of the collars 9 on the pipes 10 and 11 whereby an initial pressure is set up between the ring 1 and the said collars.

The flanges 3 of the packing ring 1 are splayed slightly outwards from the cylindrical mid portion 2 thereof, the width of the ring 1 increasing from the outer towards the inner periphery thereof, so that when the ring 1 is merely in position between the collars 9 on the adjoining ends of the pipes 10 and 11 an initial pressure is set up between the said side surfaces of the ring 1 and the adjacent inner surfaces of the said collars 9. This ensures the efficiency of the joint under low pressures.

The flanges 3 of the packing ring which, as before mentioned, are of inverted V-shape with the hollow side next the pipes 10 and 11, are now located in the recesses 8 in the housing 6, forming a cushion between the collars 9 and the rib 13 of the housing and thus permitting a considerable amount of flexibility in the alignment of the pipes. The middle cylindrical or substantially cylindrical portion 2 of the packing ring 1 is pressed tightly between the ends of the pipes 10 and 11 and the housing 6 over the gap 12 at the junction of the two pipes and bridges over and covers said gap.

When the pipes 10 and 11 are under internal pressure, any compressed fluid, which may escape at the junction 12 of the pipes, finds its way into the internal recesses 5 in the ring 1 and tends to expand or open out the hollow flanges 3 which are therefore pressed firmly against the collars 9 on the ends of the pipes 10, 11 and against the inner surface of the recesses 8 in the housing 6 and the joint is double-fluid-sealed.

When there is a vacuum in the pipes 10 and 11 any external fluid which may find its way between the packing ring 1 and the housing 6 into the groove 4 of the ring, will exert an inward pressure on the mid portion 2 of the ring where it covers the junction 12 of the pipes, and a lateral and inward pressure on the angular flanges thereby forcing them against the collars with the result that the pipes (3) will again be fluid-sealed.

A pipe joint constructed as above indicated while being equally well adapted to withstand internal or external pressure, can also be inexpensively manufactured and being of simple construction can be easily and quickly assembled or dismantled by unskilled labour. Furthermore, the construction is such that the joint, as a whole, possesses a considerable amount of flexibility.

The invention is specially adapted for the joints of thin metallic water pipes as these pipes can be made with flanges or collars by simply pressing up or swelling the same.

Having now fully described our invention what we claim and desire to secure by Letters Patent is:—

1. A pipe joint comprising a flexible packing ring having side portions of wedge like formation and a mid portion adapted to cover the adjoining ends of the pipes, a housing for the said packing ring, external peripheral projections on the adjoining pipe ends, and means for holding the pipe ends together by engagement with the said projections, the said housing having its inner peripheral surface shaped to conform to the outer peripheral surface of the said packing ring, being adapted to press the mid portion of the packing ring down on the said adjoining pipe ends and to press the wedge like side portions of the ring against the said projections.

2. A pipe joint comprising a flexible packing ring composed of a substantially cylindrical mid portion adapted to cover the adjoining pipe ends and side portions of wedge-like formation, a pair of semi-circular clamping members constituting a housing for the packing ring, means for securing the said members together, external peripheral projections on the adjoining pipe ends, and means for holding the pipe ends together by engagement with the said projections, the said clamping members having their inner peripheral surfaces shaped to conform to the outer peripheral surface of the said packing ring, being adapted to press the mid portion of the packing ring down on the said adjoining pipe ends and to press the wedge-like side portions of the ring against the said projections.

3. A pipe joint comprising a flexible packing ring composed of a substantially cylindrical mid portion adapted to cover the adjoining pipe ends and side portions of wedge-like formation, a pair of semi-circular clamping members constituting a housing for the packing ring, means for securing the said members together, external peripheral projections on the adjoining pipe ends, and means integral with the said clamping members for holding the pipe ends together by engagement with the said projections, the said clamping members having their inner peripheral surfaces shaped to conform to the outer peripheral surface of the said packing ring, being adapted to press the mid portion of the packing rig down on the said adjoining pipe ends and to press the wedge-like side portions of the ring against the said projections.

4. A pipe joint comprising a flexible packing ring of somewhat M-shaped cross section, being composed of a substantially cylindrical mid portion and side portions of hollow wedge-like formation, a housing for the packing ring, external peripheral projections on the adjoining pipe ends, and means for holding the pipe ends together by engagement with the said projections, the said M-section packing ring being fitted over the adjoining pipe ends between the said projections and being enclosed by the said housing, of which the inner peripheral surface is shaped to conform to the outer peripheral surface of the said packing ring.

5. A pipe joint, comprising a flexible packing ring of somewhat M-shaped cross section, being composed of a substantially cylindrical mid portion and side portions of hollow wedge-like formation, a pair of semi-circular clamping members constituting a housing for the packing ring, means for securing the said members together, external peripheral projections on the adjoining pipe ends, and means for holding the pipe ends together by engagement with the said projections, the said M-section packing ring being fitted over the adjoining pipe ends between the said projections and being enclosed by the said housing, of which the inner peripheral surface is shaped to conform to the outer peripheral surface of the said packing ring.

6. A pipe joint, comprising a flexible packing ring of somewhat M-shaped cross section, being composed of a substantially cylindrical mid portion and side portions which are of hollow wedge-like formation, a pair of semi-circular clamping members constituting a housing for the packing ring, means for securing the said members together, external peripheral projections on the adjoining pipe ends, and means integral with the said clamping members for holding the pipe ends together by engagement with the said projections, the said M-section packing ring being fitted over the adjoining pipe ends between the said projections and being enclosed by the said housing, of which the inner peripheral surface is shaped to conform to the outer peripheral surface of the said packing ring.

7. A pipe joint, comprising external peripheral projections on the adjoining pipe ends, a flexible packing ring, of somewhat M-shaped cross section, composed of a substantially cylindrical mid portion and side portions which are of hollow angular formation, the said side portions being splayed slightly outwards from the said cylindrical mid portion so that the width of the ring increases from the outer towards the inner periphery thereof, a pair of semi-circular clamping members constituting a housing for the packing ring, means for securing the said members together, and means integral with the said clamping members for holding the pipe ends together by engagement with the said projections, the said M-section packing ring being fitted over the adjoining pipe ends between the said projections in which position the said side portions of the ring exert an initial pressure on the inner surface of the said projections, and being enclosed by the said housing of which the inner peripheral surface is shaped to conform to the outer peripheral surface of the said packing ring.

8. A pipe joint, comprising a flexible packing ring of somewhat M-shaped cross section, being composed of a substantially cylindrical mid portion and side portions which are of hollow angular formation and of which the plane side surfaces are slightly inclined, a pair of semi-circular clamping members constituting a housing for the packing-ring, means for securing the said members together, means whereby the initial pressure of the said members on the packing ring may be made greater or less, collars on the adjoining pipe ends, and means integral with the said clamping members for holding the pipe ends together by engagement with the said collars, the said M-section packing ring being fitted over the adjoining pipe ends between the said collars and being enclosed by the said housing, of which the inner peripheral surface is shaped to conform to the outer peripheral surface of the said packing ring.

9. A pipe joint, comprising a flexible packing ring of somewhat M-shaped cross section being composed of a substantially cylindrical mid portion and side portions which are of hollow angular formation and of which the plane side surfaces are slightly inclined, a pair of semi-circular clamping members constituting a housing for the packing ring, screw bolts to secure the said members together, flanges on the adjoining pipe ends, and means integral with the said clamping members for holding the pipe ends together by engagement with the said flanges, the said M-section packing ring being fitted over the adjoining pipe ends between the said flanges and being enclosed by the said housing, of which the inner peripheral surface is shaped to conform to the outer peripheral surface of the said packing ring.

10. A pipe joint, comprising flanges on the adjoining pipe ends, a flexible packing ring, of somewhat M-shaped cross section, composed of a substantially cylindrical mid-portion and side portions which are of hollow angular formation the said side portions being splayed slightly outwards from the said cylindrical mid portion so that the width of the ring increases from the outer towards the inner periphery thereof, a pair of semi-circular clamping members constituting a housing for the packing ring, screw bolts to secure the said members together, and an annular inwardly projecting lip formed on each end surface of the said clamping members adapted to engage with the said flanges, the said M-section packing ring being fitted over the adjoining pipe ends between the said flanges, in which position the said side portions of the ring exert an initial pressure on the inner surface of the said flanges, and being enclosed by the said housing of which the inner peripheral surface is shaped to conform to the outer peripheral surface of the said packing ring.

11. A pipe joint comprising external peripheral projections on the adjoining pipes near the ends thereof, a flexible packing ring having side portions of wedge-like formation and a mid portion adapted to cover the adjoining pipe ends, the said side portions being splayed slightly outwards from the said cylindrical mid portion so that when the ring is placed between the peripheral projections on the pipes, the said side portions exert an initial pressure on the inner surface of the said projections, a housing for the said packing ring, and means for holding the pipe ends together by engagement with the said projections, the said housing having its inner peripheral surface shaped to conform to the outer peripheral surface of the said packing ring, being adapted to press the mid portion of the packing ring down on the said adjoining pipe ends and to press the wedge-like side portions of the ring against the said projections.

12. In a pipe joint, a flexible packing ring composed of a substantially cylindrical mid portion, and an exteriorly projecting flange at each side of the said portion, the flanges being substantially of hollow wedge-shape and having substantially the same internal diameter as the said mid portion, whereby a central groove is formed in the outer periphery of the packing ring and two circular grooves are provided in the inner periphery of the ring, each flange being splayed slightly outwards from the said cylindrical mid portion in such a manner that the width of the ring increases from the outer towards the inner periphery thereof.

13. In a pipe joint, a flexible packing ring composed of a substantially cylindrical mid portion, and an exteriorly projecting flange at each side of the said portion, the flanges being substantially of hollow wedge shape and having substantially the same internal diameter as the said mid portion, whereby a central groove is formed in the outer periphery of the packing ring and two circular grooves of inverted V-section are provided in the inner periphery of the ring, each flange being splayed slightly outwards from the said cylindrical mid portion in such a manner that the width of the ring increases from the outer towards the inner periphery thereof.

In testimony whereof we affix our signatures.

JAMES CARSON.
GEORGE LIDDELL.